No. 769,948. PATENTED SEPT. 13, 1904.
E. M. KRAMER.
GRAIN SEPARATOR.
APPLICATION FILED JAN. 16, 1904.
NO MODEL. 2 SHEETS—SHEET 1.
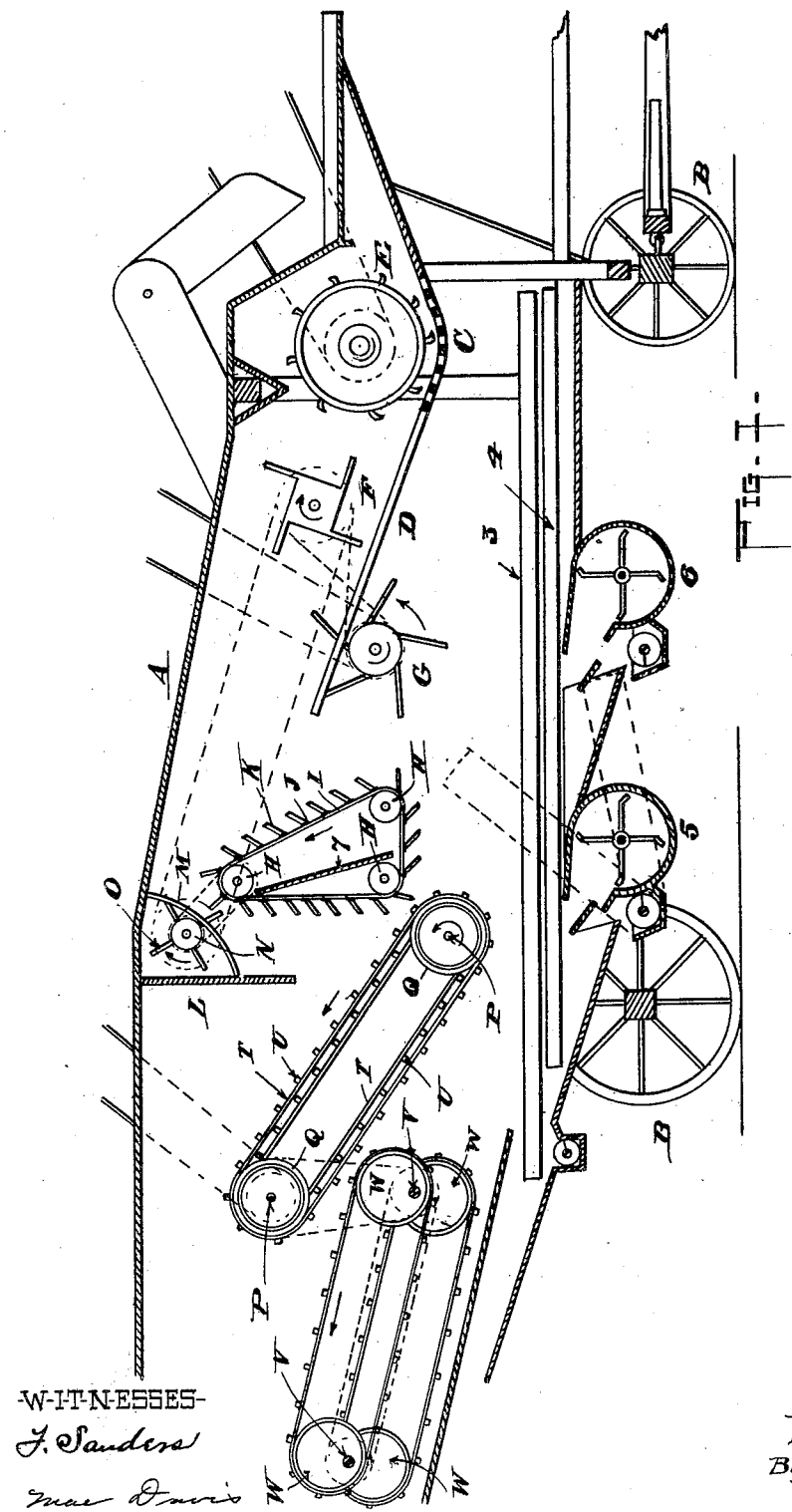
WITNESSES
F. Sanders
Mae Davis
INVENTOR
Emil M. Kramer,
By L. M. Thurlow
ATTY.

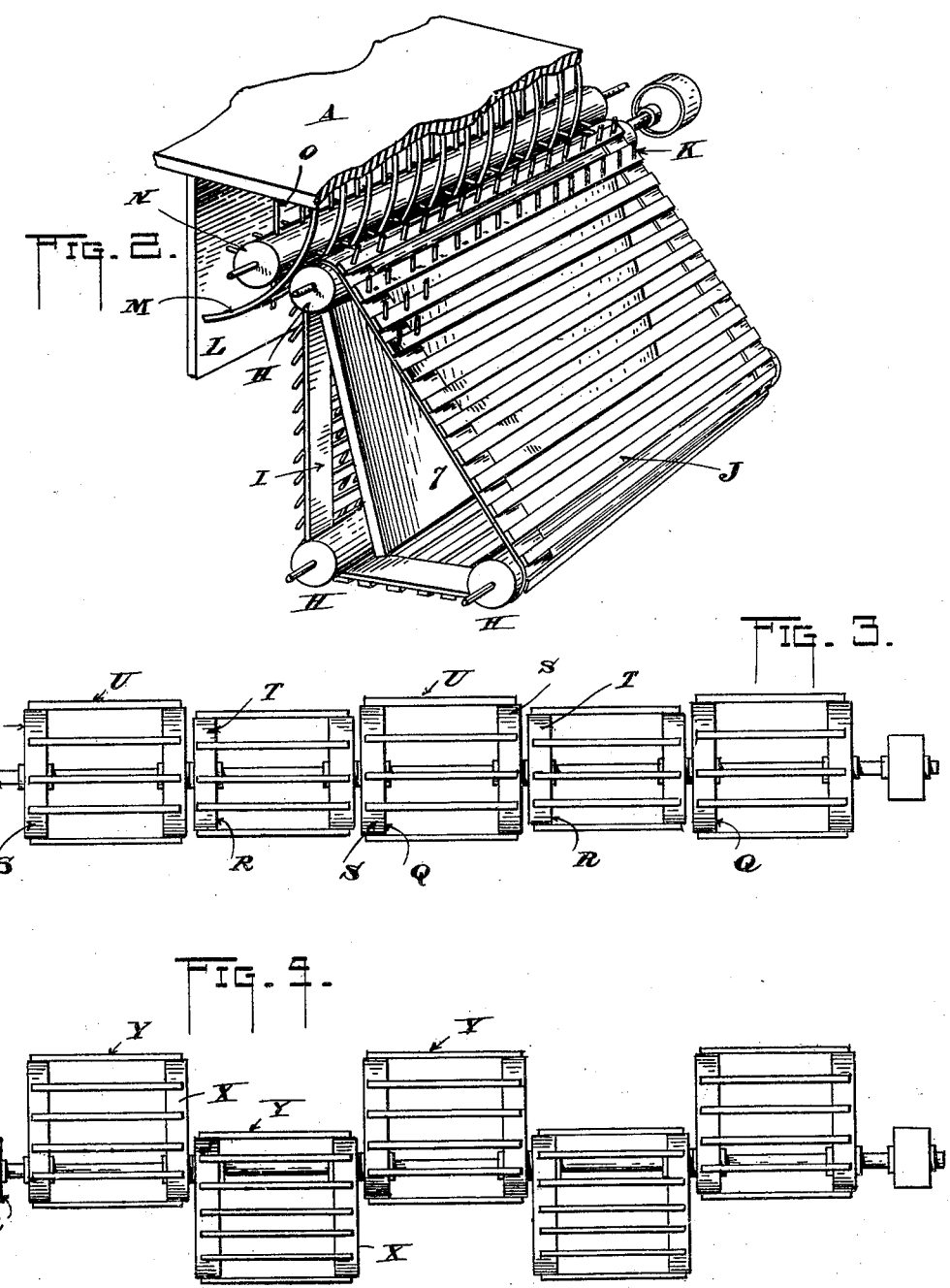

No. 769,948.                                        Patented September 13, 1904.

UNITED STATES PATENT OFFICE.

EMIL M. KRAMER, OF CISSNAPARK, ILLINOIS.

GRAIN-SEPARATOR.

SPECIFICATION forming part of Letters Patent No. 769,948, dated September 13, 1904.

Application filed January 16, 1904. Serial No. 189,389. (No model.)

*To all whom it may concern:*

Be it known that I, EMIL M. KRAMER, a citizen of the United States, residing at Cissnapark, in the county of Iroquois and State of Illinois, have invented certain new and useful Improvements in Grain-Separators; and I do hereby declare that the following is a full, clear, and exact description of the invention, which will enable others skilled in the art to make and use the same.

This invention pertains to improvements in threshing-machines or separators.

An object of the invention is to provide an entirely new means of separating the grain from the straw.

Another object of the invention is to handle the straw faster and faster as it moves away from the vicinity of the shelling-cylinder, whereby it can be more thoroughly cleaned. In most of the older types of separators the straw in passing through is allowed to bunch and become thicker and thicker, so that it has been almost impossible to properly separate the grain; but in my improved machine each succeeding member of the several members employed for getting the seed out travels faster than the one before, thus keeping the straw cleared, so that the seed may be easily shaken therefrom and allowed to fall therethrough.

My invention further relates to certain novel elements used for carrying the straw, in which the seed is more thoroughly shaken out.

A still further object is to provide a different arrangement of the various separating members, all of which will be properly described in the specification and included in the accompanying claims.

In the annexed drawings, Figure 1 is a sectional longitudinal elevation of the separator. Fig. 2 is a perspective view of certain members of the separator. Fig. 3 is an end view of a straw-carrier, and Fig. 4 is an end view of a straw-carrier and beater in a combined form.

A designates the separator-body mounted on the wheels B, as in ordinary practice. At C is the customary grate, and D represents the rearwardly-projecting fingers, all of which is sufficiently well understood to require no further description. Above the said grate C is the shelling-cylinder E, and rearward of this is a beater F, arranged to revolve much slower than the cylinder in order to retard the movement of the straw sufficiently to permit a second beater, G, toward the rear, to catch the straw and tear it to pieces, the latter beater revolving much faster than F. Said beater G is provided with long fingers which project between the fingers of the grate, and thus easily take hold of the straw to throw it upon an endless carrier. (Shown in Fig. 2.) This member consists of three rollers H, arranged in a triangle, substantially as shown in the drawings, upon which run two end belts I, and upon the said belts are secured at intervals slats J, provided with spikes K, so placed as to project upward at an angle on the forward run of the belts I, so that the straw from the beater G will be easily caught thereon. The direction of movement of the carrier thus constructed is from bottom to top, as indicated by the arrow. Above and behind the carrier is a stop-board L, forming a pocket with the top of the separator. In the angle thus formed is secured a series of outwardly-curved rods M, as shown plainly in Fig. 2, and between the stop-board and the rods or bars M is a beater N, having fingers O, which project through the bars M, as shown. The spikes K of the slats J described move in close proximity to the bars M and the fingers O of the beater N, projecting between the said bars, move between the said spikes and in revolving faster than the belts I, as is the case, the straw is torn from the spikes as it is carried toward the beater. By being thus torn by the fingers the straw is reduced in length and the grain more freely liberated by this rough handling.

Below the beater N and at the rear of the carrier H I J is an upwardly-inclined carrier comprising an upper and lower shaft P, each carrying a series of two different-sized belt-pulleys, the larger being indicated by Q and the smaller by R. Preferably the pulleys are arranged as shown in Fig. 3, with the larger and smaller alternating. The same disposition of these wheels is the same on both the upper and lower shaft, and a belt S runs over the large ones and a belt T over the small ones. The belts are provided with slats U, by which the straw falling upon them from the beater N and carrier H I J will be carried to the top. The resulting operation by reason of the peculiar arrangement of this carrier is that the straw being carried faster on the belt carried by the large pulleys than on the belt on the small ones is agitated and torn in a very thorough manner by the time it reaches the top and is delivered upon the final separating member beneath. This last member consists of two shafts V, each having a series of eccentric wheels W thereon arranged in pairs set opposite each other, as shown in Fig. 4. The several pairs of eccentrics carry the belts X, provided with slats Y. Each shaft carries a sprocket-wheel 2, but one of which is shown, (see Fig. 4,) by which the shafts are made to revolve in the same relation at all times, so that each corresponding pair of eccentrics revolve together to retain the several belts parallel with each other. It will be seen that motion imparted to the shafts V, therefore, will constantly turn the belts progressively around the eccentrics and at same time cause the latter to have a cycloidal movement. The action of the belts will now be a progression combined with a substantially vertical movement or an up-and-down motion vertical to the stretches of the belts. With the belts several times longer than the circumference of the eccentrics the straw after falling thereon will be tossed vigorously up and down several times in its movement toward the top. Evidently the longer the belts the greater the number of vertical movements will be. A reduction in the diameters of the eccentrics would also produce the same result. At the bottom of the separator the usual grain-pans 3 and 4 are provided, beneath which are the fans 5 and 6, described in a former application of mine.

As outlined in the beginning of this specification, it is the intent to handle the straw faster and faster as it proceeds through the machine. The beater F, however, holds the straw back while the beater G, which revolves much faster, tears it away from said beater F. The carrier H I J now elevates the straw fast enough to take all that is cast upon it from the said beater. Now, in order to give an idea of the manner in which the straw is subsequently handled it may be well to give the relative speeds of the various members which receive it. The said carrier H I J makes in the neighborhood of one hundred and twenty revolutions per minute, while the beater N revolves at two hundred and twenty-five per minute. The carrier P Q R moves about one hundred and sixty revolutions per minute, while the agitator V W has three hundred revolutions.

In machines of this class it has been customary to allow the straw to bunch after leaving the cylinder, and when in this condition it is impossible to properly separate the grain; but, as before stated, by moving the straw faster and faster as it leaves the vicinity of the cylinder it is easily freed of all grain, and by employing the peculiarly-constructed members described the work is still more thoroughly accomplished, the straw being entirely cleaned of the grain before it is ejected.

The beater G in throwing the straw upon the carrier H I J must, as a matter of course, cast more or less liberated grain into said carrier, and this will naturally pass through. Therefore I provide a stop-board 7, which stops the flight of the said grain, which falls upon the pans 3 and 4 described. The beater G revolves more than twice as fast as the retarding beater F, so that the straw will be thoroughly torn and scattered.

The member V W answers at once as a shaker, beater, and raddle, and thereby accomplishes what several elements are provided for in other forms of separator.

The advantages of my improved separator are at once seen, and it will be evident, in addition to what has been stated, that since the eccentrics are oppositely disposed on their shafts the weight on one side balances that of the other, thus avoiding any vibration usually present in separators by the use of the old form of shakers.

I claim—

1. In a separator, the combination of the shelling-cylinder, a retarding-beater behind the same, a beater behind the first adapted to revolve at a higher rate of speed than the first, a carrier behind the second described beater and adapted to elevate the straw from the second beater, a third beater above and behind the carrier the same adapted to tear the straw from the carrier by a faster revolution than the carrier and means in the rear of said third beater and the carrier for further separating the grain.

2. The combination of a cylinder, a concave and grating, with a beater above the grating in the rear of the cylinder, a second beater behind the first and below the grating, members of said beater extending up through the grating, an elevating-carrier behind the grating, a beater inclosed in a grating above and in the rear of the carrier, members on the beater extending through the grating, and straw-carrying means in the rear of the beater and carrier substantially as described.

3. The combination of a cylinder, a concave and grating, with a beater above the grating in the rear of the cylinder, a second beater behind the first and below the grating, members of said beater extending up through the grating, an elevating-carrier behind the grating, a beater inclosed in a grating above and in the rear of the carrier, members on the beater extending through the grating, and straw-carrying means in the rear of the beater and carrier and carried by two series of alternately large and small pulleys of corresponding size substantially as described.

4. The combination of a cylinder, a concave and grating, with a beater above the grating in the rear of the cylinder, a second beater behind the first and below the grating, members of said beater extending up through the grating, an elevating-carrier behind the grating, a beater inclosed in a grating above and in the rear of the carrier, members on the beater extending through the grating, and straw-carrying means in the rear of the beater and carrier comprising two series of alternately large and small pulleys, slatted belts running upon the pairs of pulleys of corresponding size, a straw-shaker below and in the rear of the said carrier comprising two shafts, two series of eccentrically-mounted pulleys on each shaft, each series being set on the shaft opposite the other series and slatted belts carried by the correspondingly-mounted pulleys said pulleys and belts having a cycloidal movement to agitate and carry away the straw substantially as described.

In testimony whereof I affix my signature in presence of two witnesses.

EMIL M. KRAMER.

Witnesses:
EUGENE KRAMER,
JOHN STAUTER.